(12) United States Patent
Melic (10) Patent No.: US 8,382,410 B2
(45) Date of Patent: Feb. 26, 2013

(54) ANCHOR BOLT ASSEMBLY (76) Inventor: Jonathan Jonny Melic, Stoney Creek (CA)

( * ) Notice: Subject to any disclaimer, the term of this patent is extended or adjusted under 35 U.S.C. 154(b) by 572 days.

(21) Appl. No.: 12/513,068

(22) PCT Filed: Oct. 23, 2007

(86) PCT No.: PCT/CA2007/001855
§ 371 (c)(1),
(2), (4) Date: Dec. 14, 2009

(87) PCT Pub. No.: WO2008/052313
PCT Pub. Date: May 8, 2008

(65) Prior Publication Data
US 2010/0098509 A1  Apr. 22, 2010

(30) Foreign Application Priority Data
Nov. 2, 2006 (CA) ..................... 2566986

(51) Int. Cl.
*F16B 13/04* (2006.01)
(52) U.S. Cl. ................. 411/75; 411/26; 411/76; 411/79
(58) Field of Classification Search ............. 411/26, 411/32, 44, 55, 75, 76, 79, 80, 344, 428, 411/534; 405/259.4, 259.5, 259.6; 292/341.14
See application file for complete search history.

(56) References Cited

U.S. PATENT DOCUMENTS

| | | | | |
|---|---|---|---|---|
| 3,188,815 A * | 6/1965 | Novotny et al. | ........... | 405/259.4 |
| 3,301,123 A | 1/1967 | Worley | | |
| 3,377,807 A * | 4/1968 | Nave | ........... | 405/259.4 |
| 3,695,045 A * | 10/1972 | Williams | ........... | 405/259.5 |
| 3,877,235 A * | 4/1975 | Hill | ........... | 405/259.6 |
| 4,250,960 A | 2/1981 | Chammas | | |
| 4,284,137 A | 8/1981 | Taylor | | |
| 4,320,608 A | 3/1982 | Deike | | |
| 4,478,542 A | 10/1984 | Whelan, Jr. | | |
| 4,497,367 A | 2/1985 | Stevenson | | |
| 4,643,378 A | 2/1987 | Guthrie et al. | | |
| 4,813,832 A | 3/1989 | Gerhard | | |
| 5,180,264 A * | 1/1993 | Farwell | ........... | 411/32 |
| 5,253,964 A | 10/1993 | Swemmer | | |
| 5,488,989 A | 2/1996 | Leising et al. | | |
| 5,829,531 A | 11/1998 | Hebert et al. | | |

(Continued)

FOREIGN PATENT DOCUMENTS
CA   977591   11/1975
CA   1008708   4/1977
(Continued)

*Primary Examiner* — Roberta Delisle
(74) *Attorney, Agent, or Firm* — Honigman Miller Schwartz and Cohn LLP (57) ABSTRACT

An anchor bolt assembly having a generally cylindrical grip end spaced from an actuating end. The grip end has two relatively movable mating portions each having at least one complementary ramp surface. The actuating end is used to move a movable mating portion relative to a fixed mating portion in a longitudinal direction. Actuation will cause the movable mating portion to slide relative to the static mating portion and apply radial pressure at the grip end of the anchor bolt assembly remote from the actuating end. The grip end has a roughened surface on the static mating portion while the movable mating portion is smooth. The anchor bolt assembly is particularly suitable for use in tapered holes formed in concrete.

20 Claims, 12 Drawing Sheets

U.S. PATENT DOCUMENTS

| | | |
|---|---|---|
| 5,878,818 A | 3/1999 | Hebert et al. |
| 5,919,006 A | 7/1999 | Calandra, Jr. et al. |
| 5,944,102 A | 8/1999 | Kilgore et al. |
| 6,109,578 A | 8/2000 | Guthrie et al. |
| 6,283,426 B1 | 9/2001 | Guthrie et al. |
| 6,729,821 B2 | 5/2004 | Guthrie et al. |
| 6,935,423 B2 | 8/2005 | Kusmer |
| 7,011,281 B2 | 3/2006 | Guthrie et al. |
| 7,357,363 B2 | 4/2008 | Guthrie et al. |
| D594,740 S | 6/2009 | Melic |
| 2006/0207771 A1 | 9/2006 | Rios, III et al. |
| 2007/0107339 A1 | 5/2007 | Matsumoto |
| 2008/0138152 A1 | 6/2008 | Carnevali |

FOREIGN PATENT DOCUMENTS

| | | |
|---|---|---|
| CA | 1240162 | 8/1988 |
| CA | 2184586 | 10/1995 |
| CA | 122970 | 7/2008 |
| WO | WO 00/47871 | 8/2000 |
| WO | WO 01/66961 | 9/2001 |
| WO | WO 2008/052313 | 5/2008 |

* cited by examiner

ANCHOR BOLT ASSEMBLY

This application is the National Stage of International Application No. PCT/CA2007/001855, filed Oct. 23, 2007.

FIELD OF INVENTION

This invention relates to an anchor bolt assembly for anchoring an object to a retaining structure having a pre-formed receiving hole for the anchor bolt. Where the retaining structure is rock or a concrete floor, the receiving hole may have to be drilled. In some cases, the hole may be lined with a conduit or a sleeve made of synthetic plastic material. The invention relates particularly to anchoring a safety strap or a scaffold tie to a concrete wall during the construction of high-rise buildings.

BACKGROUND OF THE INVENTION

Conveniently, receiving holes are formed by tie rods used during the pouring of concrete walls to hold wall pre-forms in spaced alignment. However, the holes left by the tie rods are generally tapered and therefore are wider on one wall surface than the opposing wall surface. This is problematic because most wall anchors currently used in construction are designed to fit into holes which have a relatively constant diameter such as holes formed by drilling. They have a limited expansion range which is not designed to fit into a tapered hole. As a result, such anchors are more likely to fail particularly when placed into the wide end of a tapered hole.

One such type of anchor is characterized by a plunger having a flared distal end that is pulled to compress a coiled spring during installation. Upon release, the spring biases the plunger into engagement with the walls of a pre-drilled hole. Fresh holes must be drilled every day to hold the anchors since the springs cannot be relied on to remain secure if left overnight.

Another problem which arises in the construction of high rise buildings is that anchors are required to enable workers to work as safely as possible at the earliest possible opportunity, sometimes while the concrete is still green and has not fully set. Because the load from most anchors is applied to the outside surface, the surface of the concrete may crumble particularly if the concrete hasn't fully set.

Common anchors for roof retaining applications in mining are not specifically designed with an attachment loop to secure objects like a safety strap and are not convenient for use in construction where a plurality of anchors are required at once on every floor of the building as the construction progresses. In addition, safety straps usually need to be removed from the building walls once the exterior wall panels and windows have been installed and unless the anchors are removable, the safety straps are often sacrificed and simply cut, for example when attached to vertical reinforcement bars disposed in the concrete walls.

Therefore, there exists a need for an improved anchor bolt which will at least in part address some of the aforementioned problems.

SUMMARY OF THE INVENTION

The invention provides an anchor bolt assembly having a generally cylindrical grip end spaced from an actuating end. The grip end has two relatively movable mating portions each having at least one complementary ramp surface. The actuating end is used to move a movable mating portion relative to a fixed mating portion in a longitudinal direction. Actuation will cause the movable mating portion to slide relative to the static mating portion and apply radial pressure to the grip end of the anchor bolt assembly remote from the actuating end.

The static mating portion has an outer peripheral surface that is roughened for radial penetration into a surrounding hole while the moveable mating portion has a smooth outer peripheral surface.

An attachment loop is formed at the actuating end for attachment to an object. In a preferred embodiment of the invention, the attachment loop is integral with the movable mating portion.

To improve the reliability of the anchor bolt in tapered receiving holes, the complementary ramp surfaces preferably have different lengths and depths and a test gauge is integrated into the anchor whereby correct loading of the anchor can readily be maintained and verified.

An adaptor is also provided to allow the anchor to be used in larger diameter holes than a nominal diameter for the anchor.

BRIEF DESCRIPTION OF THE DRAWINGS

So that the invention may be more clearly understood, preferred embodiments are described below with reference to the accompanying drawings, in which:

FIG. 5 is a sectional view thereof showing the anchor bolt assembly in a final position in the pre-formed hole;

DESCRIPTION OF PREFERRED EMBODIMENTS WITH REFERENCE TO DRAWINGS

Figure 1:
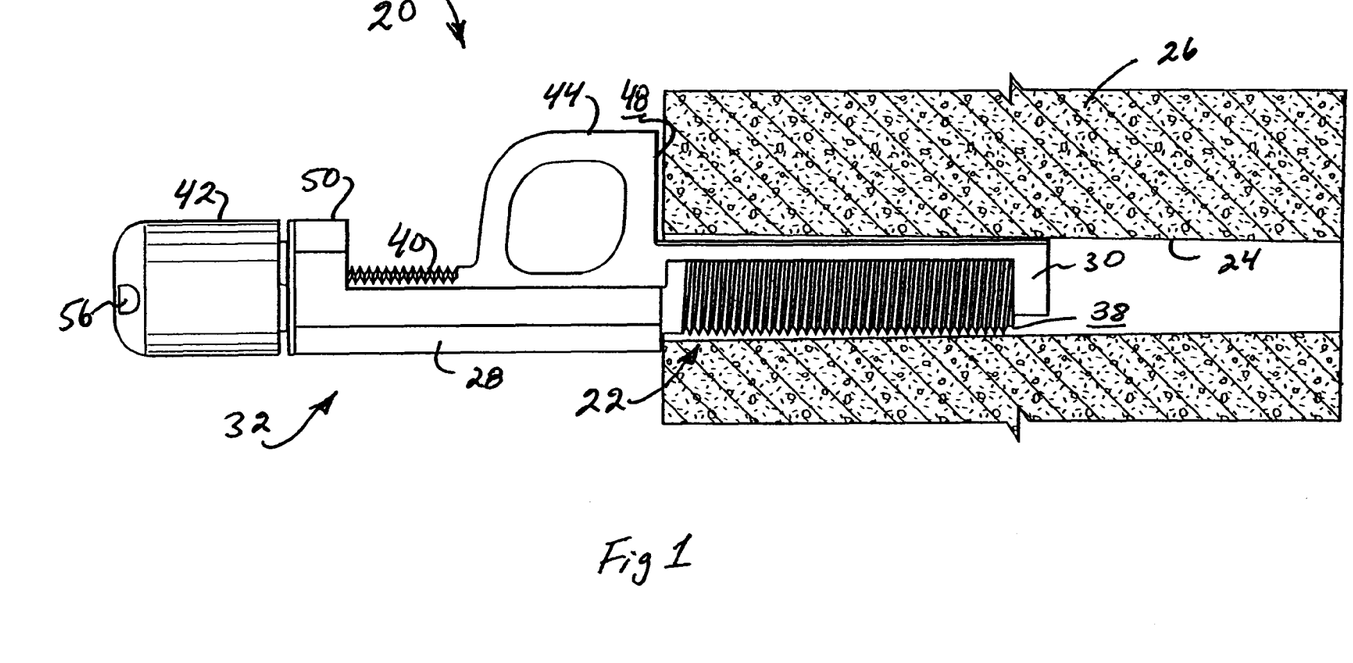
FIG. 1 is a side elevation view of a first embodiment of the invention shown in place in a pre-formed tapered hole in a concrete wall section.

Referring to FIG. 1, there is illustrated a first embodiment of an anchor bolt assembly made according to the invention and generally indicated by reference numeral 20. The anchor bolt assembly 20 has a generally cylindrical grip end 22 which is disposed in a pre-formed receiving hole 24 formed in a concrete wall 26. The grip end 22 is formed by a static mating portion 28 and a movable mating portion 30 (more clearly seen in FIG. 3). Relative motion between the mating portions is effected by an actuating end 32 which as shown in FIG. 1 is disposed in use outside of the concrete wall 26. The features of the grip end 22 will first be described and then the features of the actuating end 32 will be described.

Figure 6:
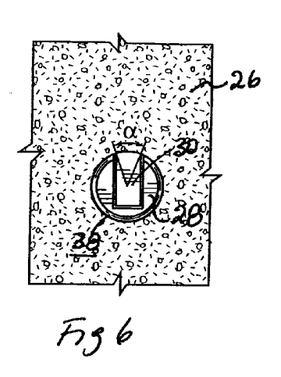
FIG. 6 is an end view of the anchor bolt assembly drawn from the right of FIG. 4.
Figures 7, 8:
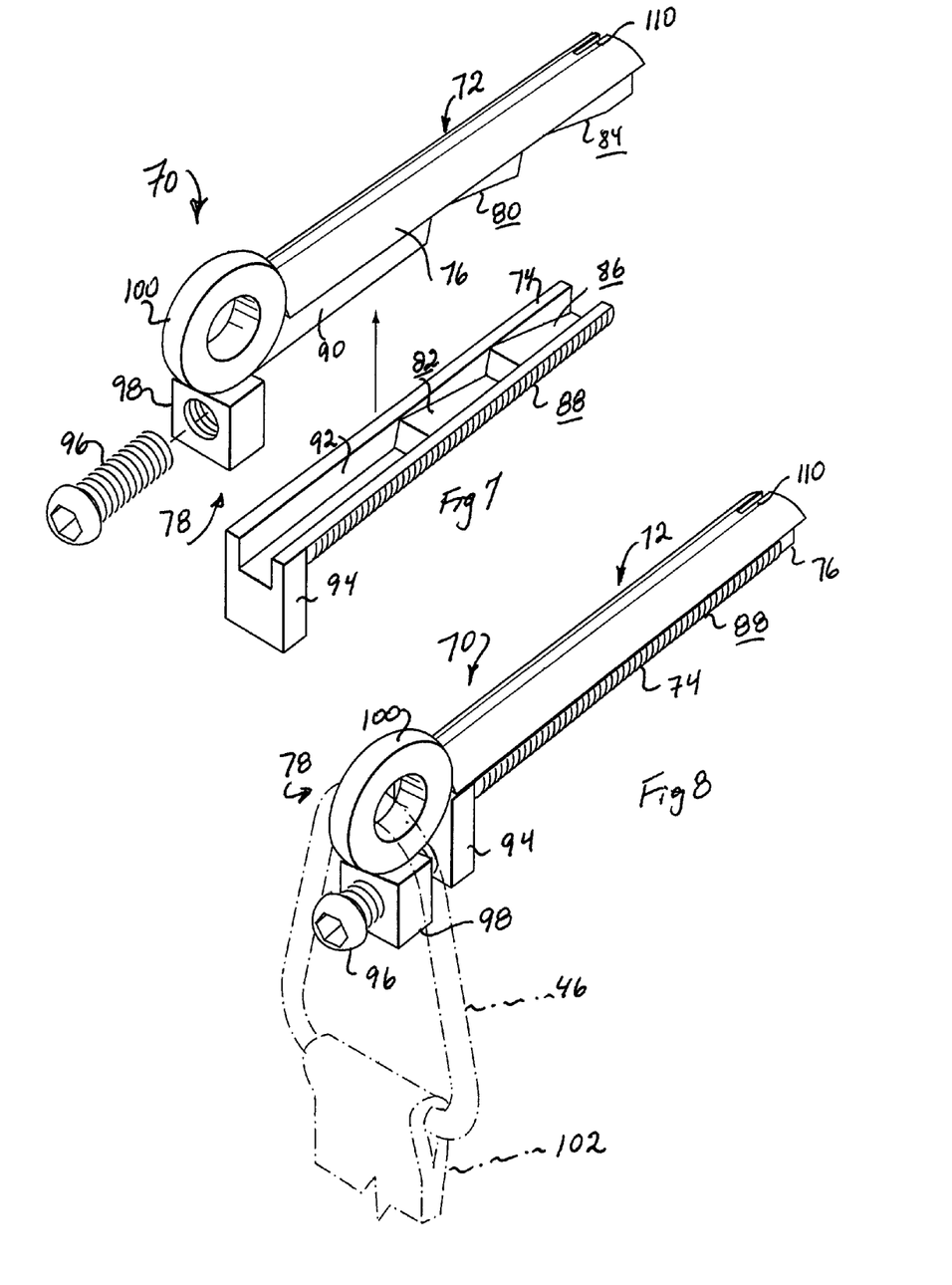
FIG. 7 is an exploded view of a second embodiment of the invention.
FIG. 8 is a perspective view of the second embodiment in an assembled configuration.

In the embodiment illustrated, each of the mating portions 28, 30 has a single ramp having complementary ramp surfaces 34, 36 which are inclined to a longitudinal axis for the anchor bolt assembly 20. It will be seen that the outer peripheral surface 38 of the static mating portion 28 is roughened for radial penetration into the surrounding hole 24, in this case by a thread cut into the surface while the outer peripheral surface of the moveable mating portion 30 is smooth. The grip end 22 of the static mating portion 28 may also be roughened in other ways and may be toothed or serrated for this purpose. As seen in the end view of FIG. 6, the outer peripheral surface of the grip end 22 defined by the movable mating portion 30 has an arc length which is subtended by an angle α of less than 90°. As a result, it will be appreciated that a significant portion of the outer peripheral surface of the grip is defined by the threaded roughened surface 38 thereby assuring a greater grip by radial penetration of the static mating portion 28 into the surface of the surrounding hole 24, as will be described in more detail below.

As described previously, the hole 24 is a tapered hole which may be formed by withdrawing greased tie-rods positioned to hold wall pre-forms during pouring of the concrete. In the drawings illustrated, the grip end 22 is positioned into the larger diameter end of the hole 24 drawn to the left of the Figures. However, it will be appreciated that the grip end 22 may also be placed into the narrow diameter end of the hole 24 drawn to the right of the Figures.

The actuating end 32 of the anchor bolt assembly is comprised of a threaded portion 40 formed at an end of the movable mating portion 30 remote from the grip end and by a cooperating nut 42 having an internal thread sized to receive the threaded portion 40. A transversely disposed attachment loop 44 for attachment to an object such as buckle 46 (FIG. 4, 5) for a safety strap (not shown) is fixed to the movable mating portion 30 between the threaded portion 40 and the grip end 22 of the anchor bolt assembly 20. It will be seen that the attachment loop 44 extends transversely from one side of the movable mating portion 30 and has a flat end surface 48 for engaging the outer surface of the concrete wall 26.

The static mating portion 28 has a coupling ring 50 formed at an end remote from the grip end 22 which slidingly receives the threaded portion 40 of the movable mating portion 30 therethrough. In the fully assembled configuration, a washer 52 and spring washer 54 are disposed between the coupling ring 50 and the nut 42. The coupling ring 50 is formed in the shape of an oval in order to accommodate the threaded portion 40 and to allow lateral displacement of the threaded portion 40 when the anchor is used in a tapered receiving hole.

Figures 2, 3:
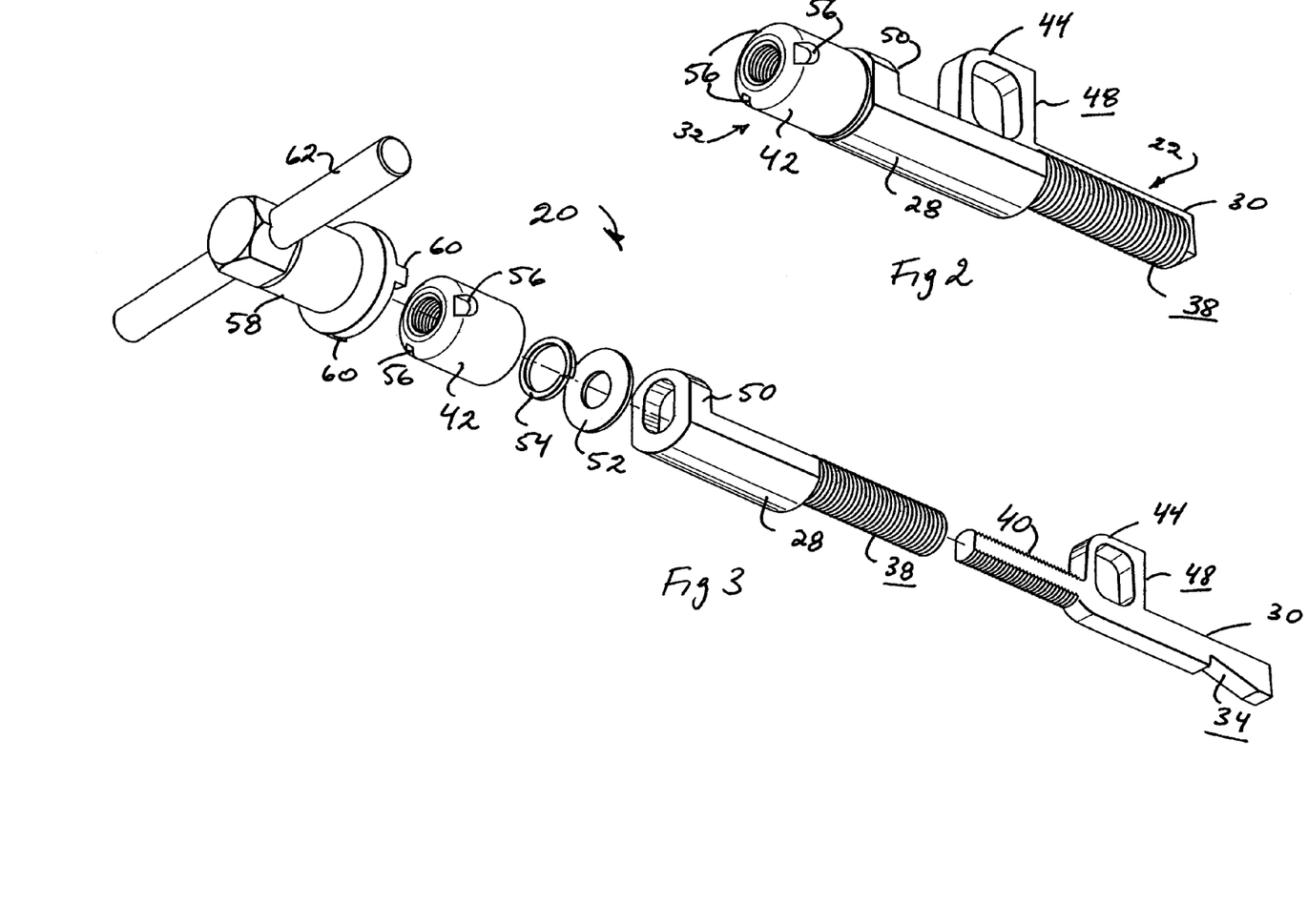
FIG. 2 is a perspective view thereof (drawn to a smaller scale)
FIG. 3 is an exploded view thereof.
Figure 3:
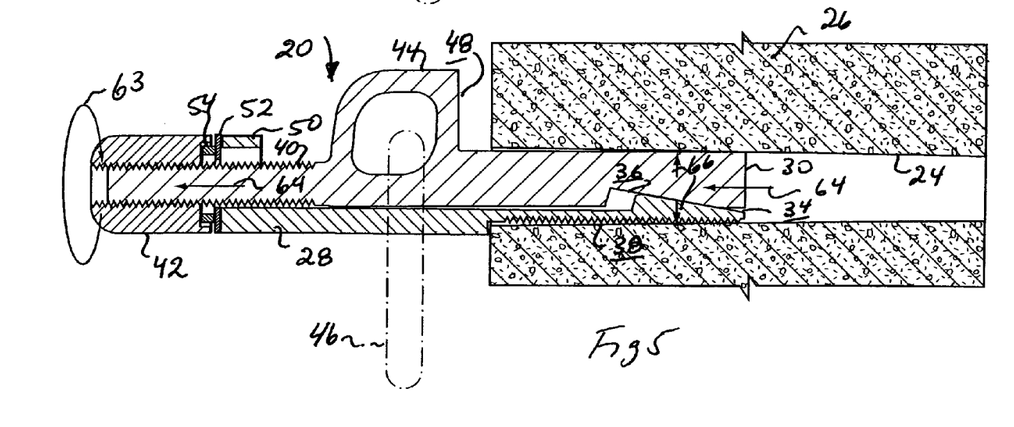

As can be seen more clearly in the views of FIGS. 1, 2, and 3, the nut 42 has a smooth outer surface and three locating dimples 56 angularly disposed relative to each other at 120° and shaped to receive a custom tool 58 (FIG. 3) having a corresponding number of cooperating lugs 60 shaped to engage the dimples 56. The tool 58 is thereby adapted to rotate the nut 42 on the threaded portion 40 upon rotation of the handle 62 forming part of the tool 58. Without the custom tool, the nut is difficult to manipulate thereby minimizing the risk of vandalism and of tampering with the anchor.

In use, an anchor bolt assembly 20 made in accordance with the invention is disposed in a receiving hole 24. Care does not need to be taken to ensure that the anchor bolt assembly is disposed in the narrow end of the hole or the wide end of the hole since the anchor bolt assembly 20 may be securely installed from either end of the hole. The mating portions 28, 30 are disposed in a mating position with the complementary ramp surfaces 34, 36 disposed adjacent each other and the movable mating portion 30 in a forward position, as drawn in FIG. 4. In this position, it will be noted that the attachment loop 44 of the movable mating portion 30 is placed adjacent to the outer wall surface.

Figure 4:
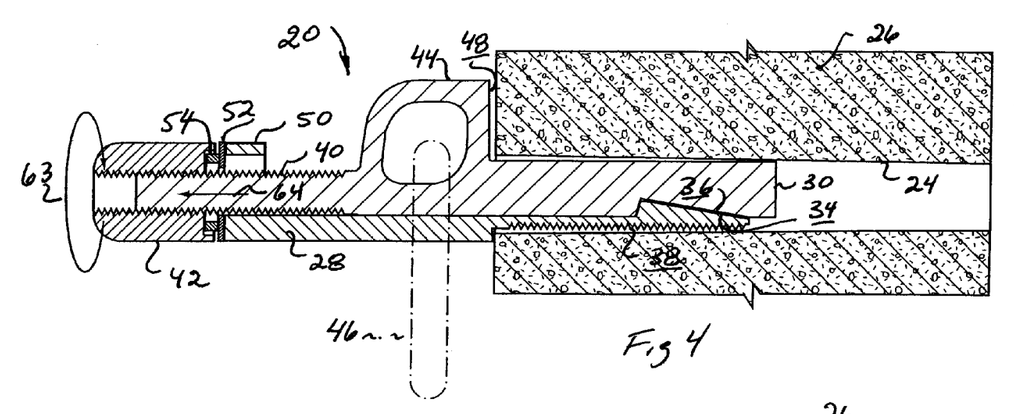
FIG. 4 is a sectional view thereof showing the anchor bolt assembly in an initial position in the pre-formed hole.

As drawn in FIGS. 4 and 5, the threaded rough surface 38 of the static mating portion 28 is oriented to engage the bottom surface of the receiving hole 24. However, in circumstances where the holes 24 have dirt and debris, it may be preferable to orient the anchor bolt assembly 20 so that the threaded roughened surface 28 is oriented upwardly.

The tool 58 is then used to advance the nut 42 on the threaded portion 40 by rotating the handle 62 as indicated by arrow 63 thereby pulling the movable mating portion 30 in a longitudinal direction away from the wall 26 as indicated by arrow 64. It will be appreciated that in the process of separating the movable mating portion 30 from the static mating portion 28 as shown in FIG. 5, the mating portions 30, 28 are caused to move outwardly as indicated by arrows 66 thereby applying radial pressure to the grip end of the anchor bolt assembly to the side wall of the receiving hole 24.

Meanwhile, the oval shaped coupling ring 50 limits the radial separation of the mating portions 28, 30 at the actuating end 32 so that most of the pressure is applied to the grip end 22. In addition, it will be observed that the transverse location of the attachment loop 44 transmits a transverse load applied through the buckle 46 so that the grip end 22 is further brought into gripping engagement with the surface of the hole 24 in the concrete wall 26. In this way, any load applied through the buckle 46 operates to more securely lock the anchor bolt assembly in the receiving hole 24.

In an alternative embodiment of the invention illustrated by FIGS. 7 to 11, the anchor bolt assembly 70 has a generally cylindrical grip end 72 formed by a static mating portion 74 and a movable mating portion 76 similarly to the first embodiment. Relative motion between the mating portions is effected by an actuating end 78.

In this embodiment of the invention, the mating portions 74, 76 each have a pair of ramps having complementary ramp surfaces (80, 82), (84, 86) which are inclined to a longitudinal axis for the anchor bolt assembly 70 and longitudinally spaced from each other at the grip end 72. As in the first embodiment, the outer peripheral surface 88 of the static mating portion 74 is roughened for radial penetration into a surrounding hole. As can be seen in the end view of FIG. 11, the outer peripheral surface of the grip end 72 defined by the movable mating portion 76 has an arc length which is subtended by an angle which is greater than 90° and is approximately 180° so that in this case the movable mating portion 76 appears to have a mushroom cross-section in which the stem portion 90 is slidingly received in a cooperating groove 92 formed in the static mating portion 74.

In the anchor bolt assembly 70, the grip end 72 is made somewhat longer than the single ramp grip end 22 of the first embodiment of the anchor bolt assembly 20. It is intended that the anchor bolt assembly 70 be used in situations where a concrete wall has not yet fully set and is perhaps still "green". It is expected that the greater surface area of contact between the movable mating portion 76 and the receiving hole 24 will operate to better distribute the load so that the movable mating portion 76 is less prone to cut into the wall surface inside the receiving hole 24 and cause an otherwise fragile concrete surface to be broken up upon actuation of the actuating end 78.

The static mating portion 74 has a transversely disposed lug 94 at one end remote from the ramp surfaces 82, 86 for abutting an outer surface of the concrete wall 26. In use, the lug 94 defines a bearing surface for a threaded fastener 96 in the form of a bolt which is received through a cooperating nut 98 which is fixed to the movable mating portion 76. In the embodiment illustrated, an attachment loop 100 is fixed between the nut 98 and the actuating end of the movable mating portion 76. As previously described with reference to the first embodiment, a buckle 46 for securing an object like a safety strap 102 to the anchor bolt assembly 70 is threaded through the attachment loop 100.

Figure 9:
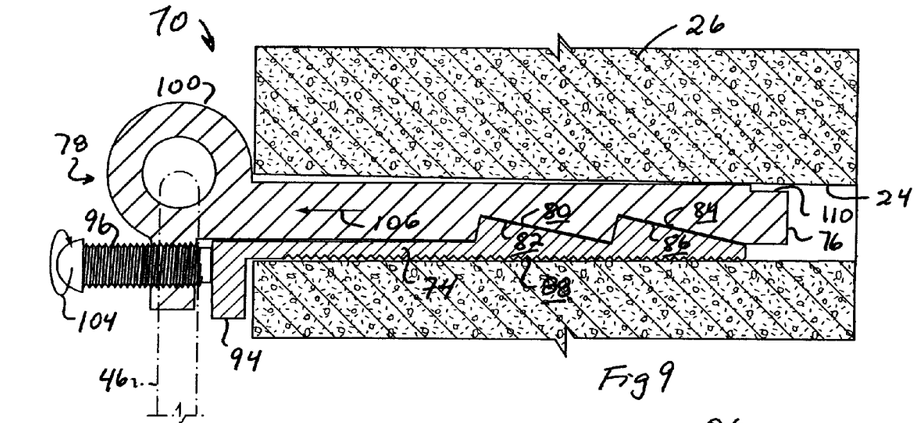
FIG. 9 is a sectional view of the second embodiment showing the anchor bolt assembly in an initial position in a pre-formed tapered hole.
Figure 10:
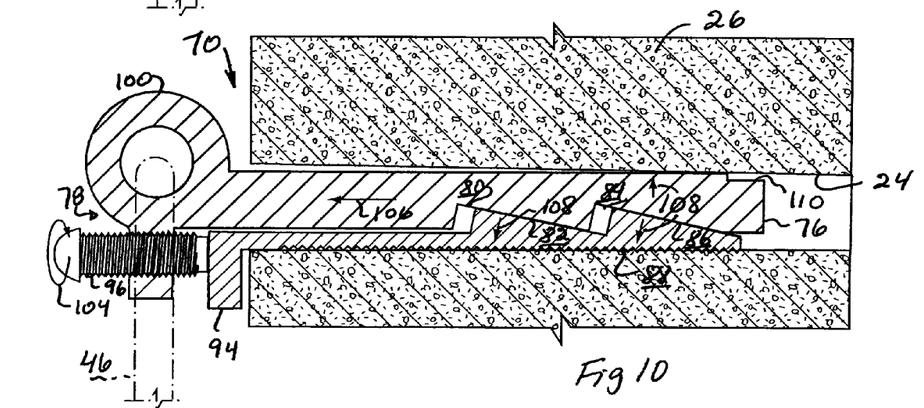
FIG. 10 is a sectional view of the second embodiment showing the anchor bolt assembly in a final position in the pre-formed hole.
Figure 11:
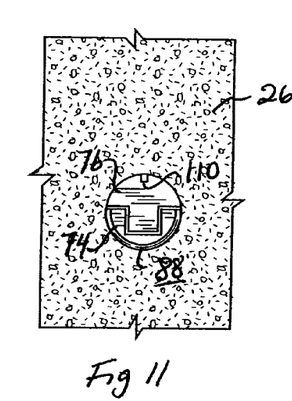
FIG. 11 is an end view of the anchor bolt assembly drawn from the right of FIG. 9.

The operation of the anchor bolt assembly 70 is similar to that of the anchor bolt assembly 20 described previously. In use, rotating the threaded fastener 96 as indicated by arrow 104 to push against lug 94 will cause the movable mating portion 76 to slide in an axial direction as indicated by arrow 106 (FIG. 9). This longitudinal movement will cause the ramp surfaces to part as shown in FIG. 10 and to apply radial pressure at the grip end of the anchor bolt assembly 70 as indicated by arrows 108.

It will be noted that rotation of the threaded fastener 96 in the opposite direction indicated by arrow 104 will operate to release the anchor bolt assembly 70 from the receiving hole 24 so that the anchor bolt assembly may be removed and reused at another location. It will be appreciated that repeated, successive installation and withdrawal of an anchor bolt assembly will cause the grip end 72 to wear and that some indication of such wear will be helpful since the diameter of the grip end must in some way be selected to cooperate with the internal diameter of the receiving hole 24. In the embodiment illustrated, a small groove 110 is cut in the end of the movable mating portion 76 opposite from the ramp 84 so that when the adjacent material is worn, the groove 110 will function as a durability marker.

Figure 12:
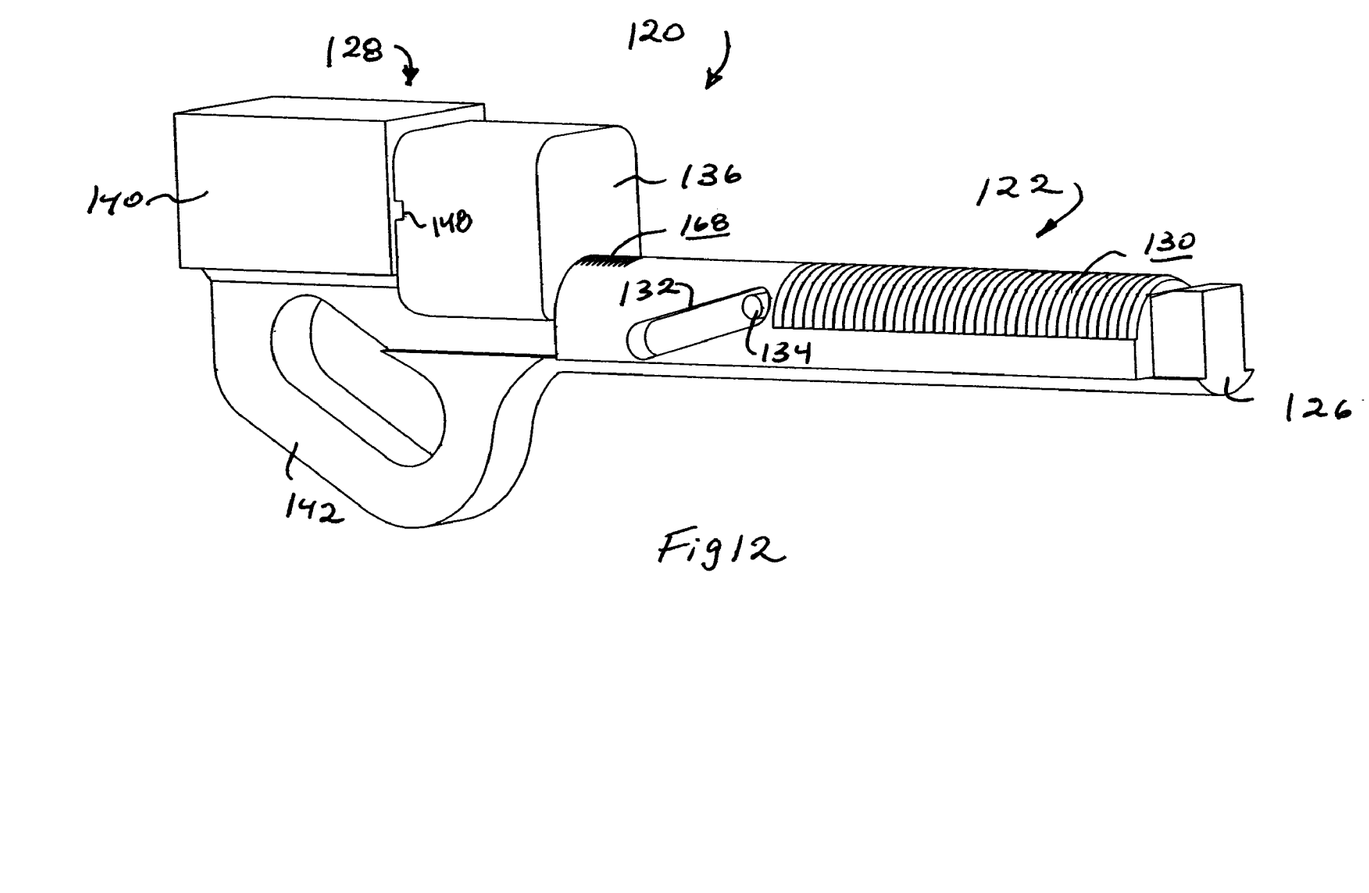
FIG. 12 is a perspective view of a third embodiment of the invention in a preloaded configuration.
Figure 13:
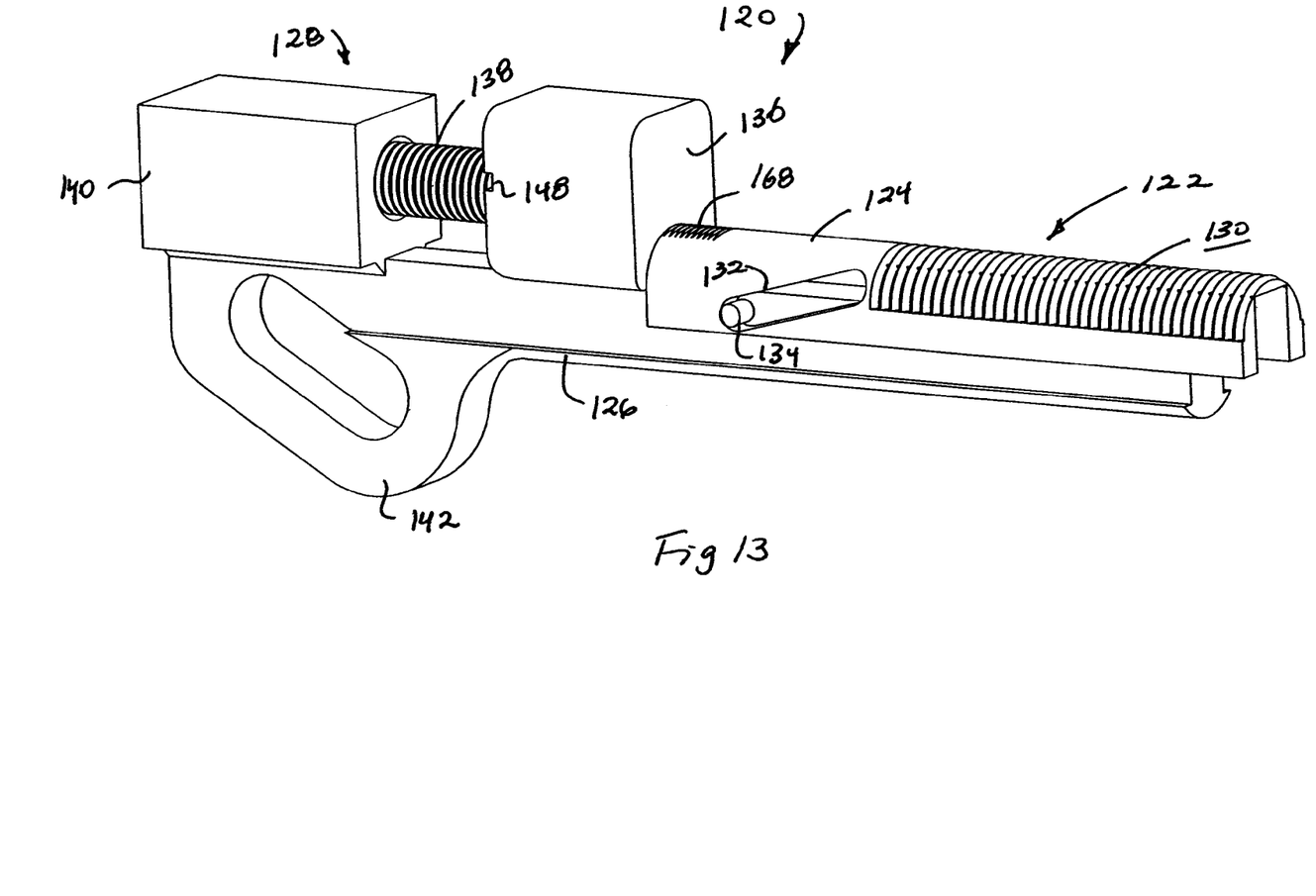
FIG. 13 is a similar view to FIG. 12 showing the anchor bulk assembly in a loaded configuration.

A third embodiment of the invention is shown in FIGS. 12 and 13 and the manner of operating the anchor bolt assembly is illustrated by the cross-sectional views of FIGS. 14 to 22. The anchor bolt assembly 120 of FIG. 12 is very similar in many respects to the second embodiment described above with reference to FIGS. 7 to 11. A generally cylindrical grip end 122 is formed by a static mating portion 124 and a moveable mating portion 126. Relative motion between the mating portions is effected by an actuating end 128. As in the case of the two other embodiments, the static mating portion 124 has an outer peripheral surface which is roughened by cutting a thread so that the grip end will penetrate into a receiving hole. The roughened surface is indicated by reference numeral 130 and extends from a distal end of the static mating portion along a portion of the length of the static mating portion. The body of the static mating portion 124 has an inclined slot 132 cut into one side which slidingly receives an outwardly extending pin 134 which is fixed to the moveable mating portion 126. In this way, the moveable mating portion 126 and the static mating portion 124 are coupled to prevent their separation from each other and yet the width of the slot 132 is sufficiently wide to allow the moveable mating portion 126 to move in a radial direction away from the static mating portion 124. Conveniently, by coupling the moveable mating portion to the static mating portion, the anchor can be provided as s single piece that does not require assembly.

As in the case of the second embodiment, the static mating portion 124 has a transversely disposed block 136 which is analogous to the lug 94 and is disposed at one end remote from the roughened surface 130. The transversely disposed block 136 will in use abut an outer surface of a supporting structure such as a concrete wall 26. At the other end, the block 136 defines a bearing surface for a threaded fastener 138 which is shown in the form of a bolt that is received through a cooperating nut housing 140 which is fixed to the moveable mating portion 126. In the embodiment illustrated, an attachment loop 142 is positioned between the nut housing 140 and the actuating end of the moveable mating portion 126.

Figure 14:
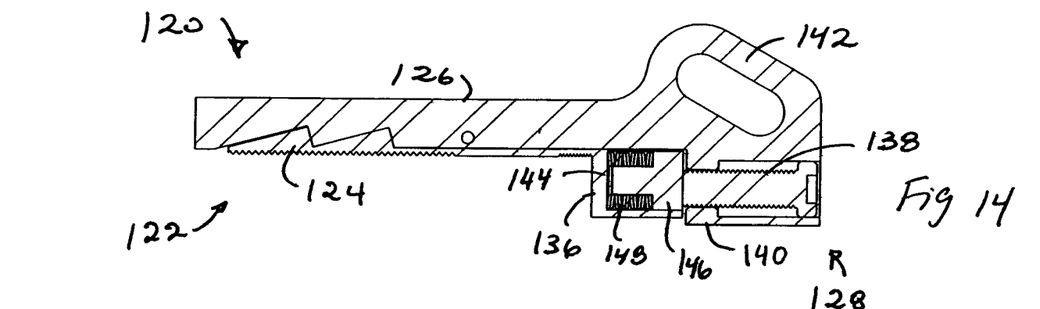
FIG. 14 (drawn to a smaller scale) is a cross-sectional view of the anchor bolt assembly of FIG. 12.

Now turning to FIG. 14, it will be seen that the block 136 is hollow and has a recess 144 that receives a resiliently biased plunger 146 for bearing against the threaded fastener 138. In the embodiment illustrated, the resiliency is provided by a plurality of stacked Bellville washers 148.

Figure 15:
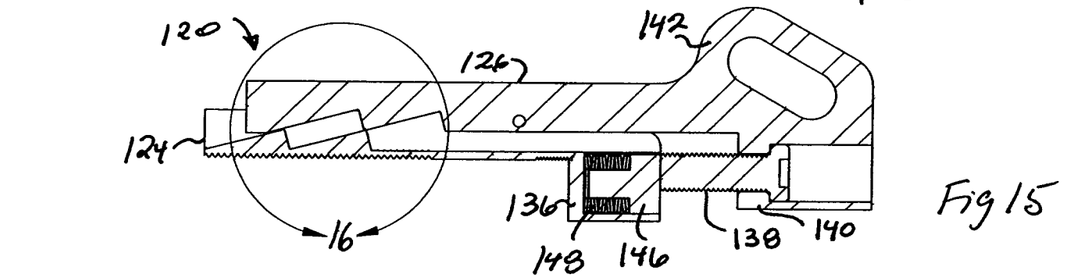
FIG. 15 is a cross-sectional view of the anchor bolt assembly of FIG. 13 as it would appear in a constant diameter hole.
Figure 16:
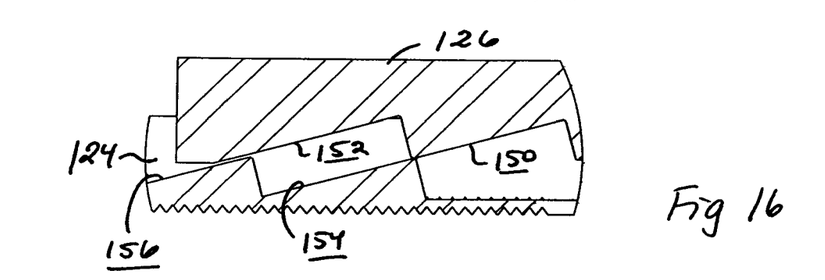
FIG. 16 is a similar view to FIG. 15 of circled area 16 drawn to a larger scale.

The operation of the anchor bolt assembly 120 will first be described with reference to its installation in a constant diameter (straight) hole as shown in FIGS. 15 and 16. The threaded fastener 138 is received through the nut housing 140 and has a predetermined threaded length which is selected to withdraw the moveable mating portion 126 from a receiving hole by a predetermined distance corresponding to a maximum separation between the static mating portion 124 and the moveable mating portion 128. A comparison of the drawings of FIG. 15 and FIG. 14 shows how advancing the threaded fastener 138 through the nut housing 140 causes the moveable mating portion 126 to become separated from the static mating portion 124. The bolt head of the threaded fastener 138 comes to rest against the nut housing 140 when it has advanced its maximum distance and applied the maximum pressure against the bearing surface defined by the plunger 146 received in the block 136. A small notch 148 (see FIG. 12, 13) will provide a visual indication of whether the plunger 146 has been released from its loaded position in the block 136 to alert a user of any tampering of the anchor bolt assembly 120 or a failure resulting from displacement of the moveable mating portion 126 after installation of the anchor bolt assembly.

This is a very attractive feature of the anchor bolt assembly 120 which will allow users to have confidence that they can rely on the anchor bolt assembly being installed securely and properly.

The grip end 122 features a pair of complementary ramp surfaces inclined to a longitudinal axis for the anchor bolt. The moveable mating portion 126 has an inner ramp surface 150 and an outer ramp surface 152 while the static mating portion 124 has an inner ramp surface 154 and an outer ramp surface 156. These are shown in the large scale view of FIG. 16. The ramp surfaces are cut adjacent to each other and are longitudinally spaced on the grip end 122 of the anchor bolt assembly 120. The ramp surfaces are complementary so that they can nest together as shown by FIG. 14 when the anchor bolt assembly 120 is in an unloaded configuration. During loading of the anchor bolt assembly, the mutually adjacent ramp surfaces (150, 154), (152, 156) slide upon each other so as to become separated and arrive at the loaded configuration of FIG. 15. In so doing, the distal ends of the moveable mating portion 126 and the static mating portion 124 become separated so as to occupy a larger diameter in the receiving hole and thereby come into engagement with the walls of the receiving hole.

When the threaded fastener 138 has advanced its maximum length, as shown by FIG. 15, the inner ramp surface 150 of the moveable mating portion 126 has a trailing edge which overlaps with the forward edge of the inner ramp surface 154 of the static mating portion 124. The overlap is greater between the trailing edge of the outer ramp surface 152 of the moveable mating portion and the leading edge of the outer ramp surface 156 of the static mating portion to ensure that at least one pair of ramp surfaces are always in a close mating relationship to continue to secure the anchor bolt assembly 120 even when the moveable mating portion 126 is accidentally dislodged from its fully loaded position. Accordingly, the length of the outer ramp surface 152 of the moveable mating portion 126 is longer than the length of the inner ramp surface 154 on the static mating portion 124.

As mentioned in the introduction, the anchor bolt assembly according to the invention is particularly directed to be used in existing tapered holes which are formed in great numbers during the construction of concrete walls. These holes are tapered and are not always formed so that the narrow end of the holes terminate on the same wall surface. Accordingly, it is convenient not only to have an anchor which can be inserted into a tapered hole but to also have an anchor which can be inserted both in the small diameter end of a tapered hole as well as the large diameter end of a tapered hole.

Figure 17:
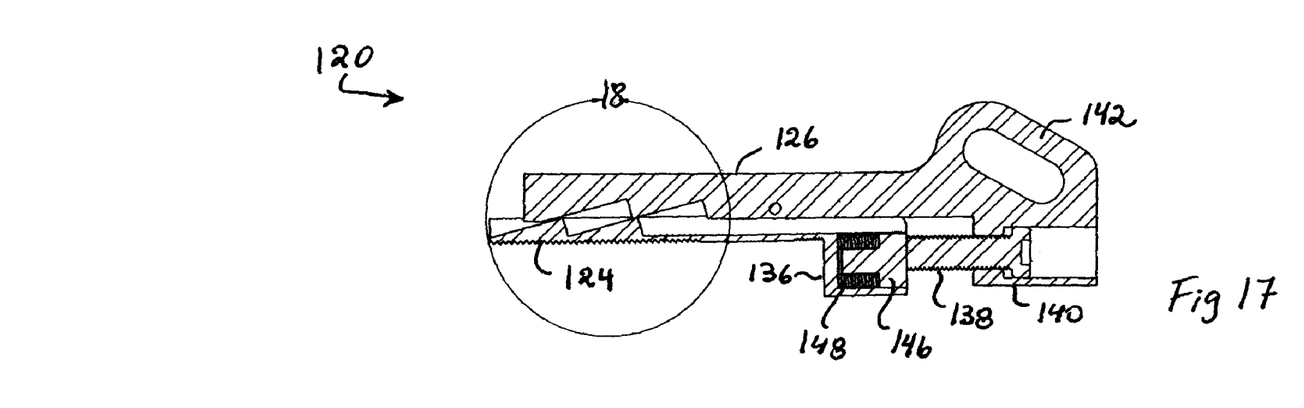
FIG. 17 is a similar view to FIG. 15 showing the anchor bolt position as it would appear inserted into the small diameter end of a tapered hole.
Figure 18:
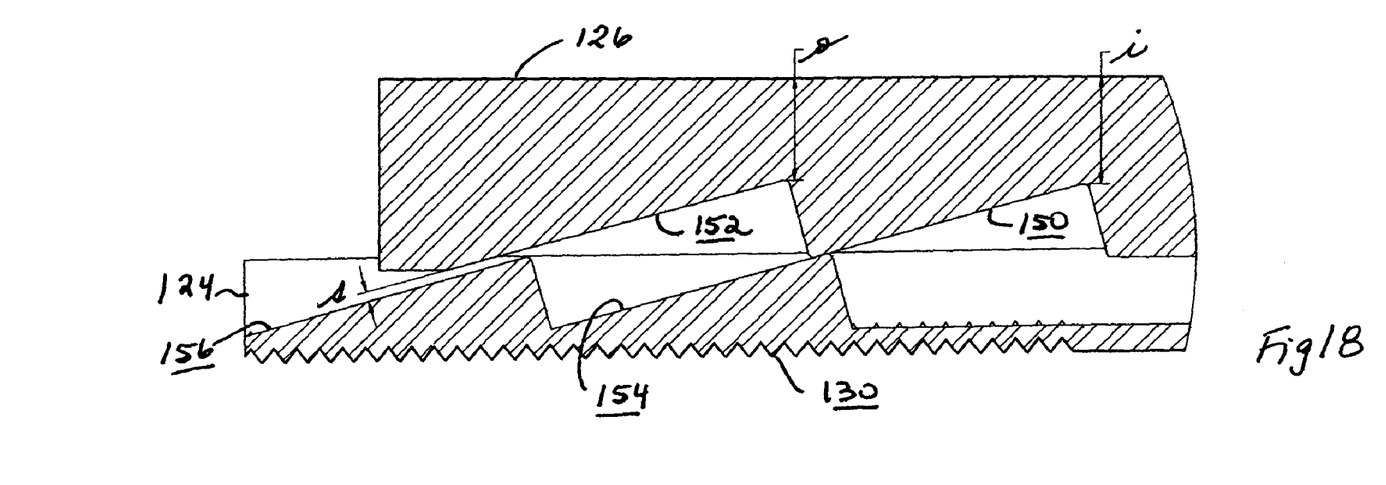
FIG. 18 is a similar view to FIG. 17 of circled area 18 drawn to a larger scale.

In FIG. 17, the anchor bolt assembly 120 has been inserted into the small diameter end of a tapered hole and the relative positions of the moveable mating portion 126 and the static mating portion 124 is changed accordingly in the fully loaded position shown in greater detail in FIG. 18. Here it will be observed that the outer ramp surfaces 152, 156 of the moveable mating portion and the static mating portion respectively are somewhat separated while the inner ramp surfaces 150, 154 of the moveable mating portion and the static mating portion respectively remain adjacent to each other. Where the trailing edge of the inner ramp surface 150 overlaps with the leading edge of the inner ramp surface 154, it defines a fulcrum that allows a rocking motion between the moveable mating portion 126 and the static mating portion 124 so that the anchor can be disposed in a tapered receiving hole (which does not have a constant diameter).

In order to achieve this configuration shown in FIG. 18, the depth o of the outer ramp surface 152 on the moveable mating portion 126 is made narrower than the depth i of the inner ramp surface 150 on the moveable mating portion 126 (i.e. o is less then i). The small difference between the depth o and the depth i results in a small separation s of the order of only one half millimeter between the outer ramp surfaces 152, 156 but it is sufficient to ensure that the configuration of FIG. 18 can be achieved by design.

Figure 19:
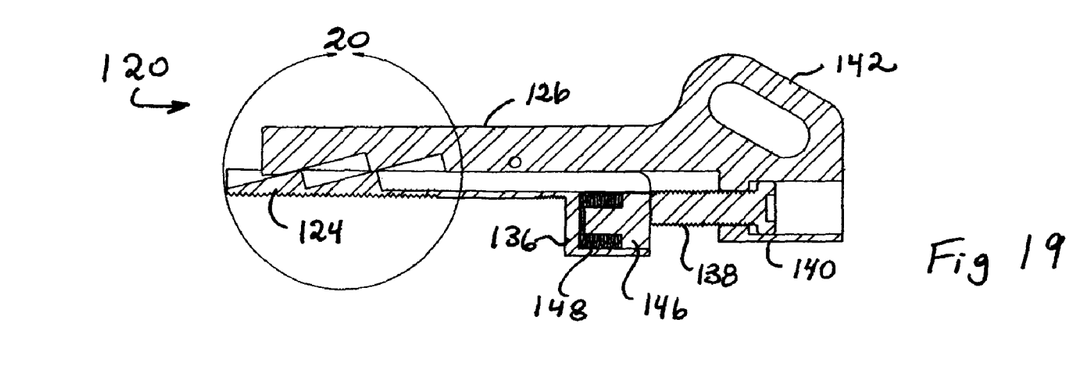
FIG. 19 is a similar view to FIG. 15 showing the anchor bolt position as it would appear inserted into the large diameter end of a tapered hole.
Figure 20:
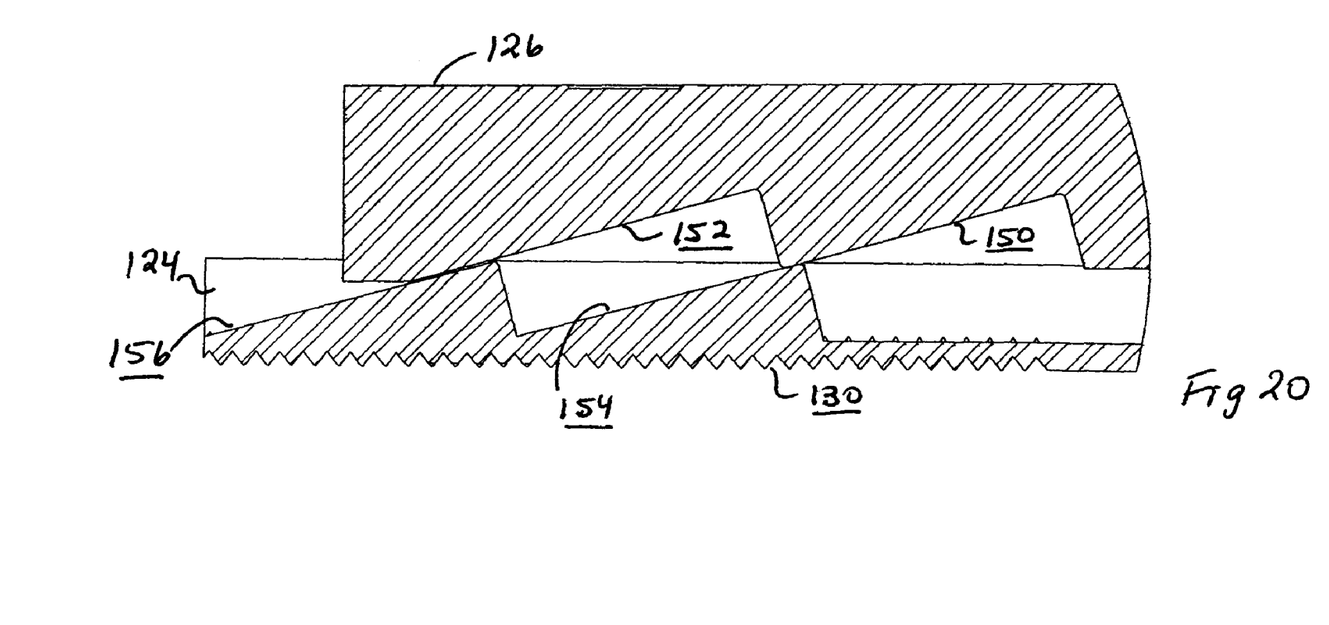
FIG. 20 is a similar view to FIG. 19 of circled area 20 drawn to a larger scale.
Figure 21:
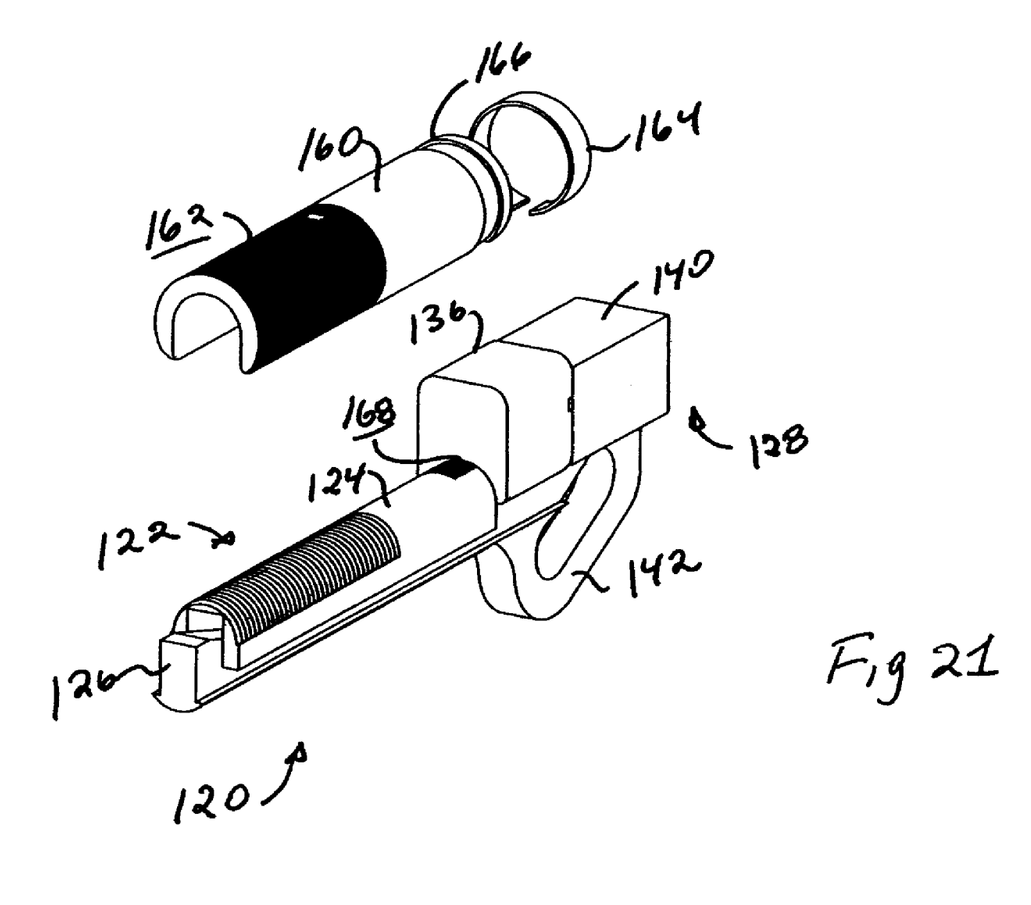
FIG. 21 is an exploded view of the anchor bolt assembly of FIG. 12 with an adaptor for fitting the assembly into a larger diameter hole.

In FIG. 19, the anchor bolt assembly 120 has been inserted into the large diameter end of a tapered hole and a similar configuration is achieved in the fully loaded condition illustrated by FIG. 20. Here there is still overlap between adjacent ramp surfaces and the fulcrum for rocking or tilting between the moveable mating portion and static mating portion remains defined between the inner ramp surfaces 150, 154.

Typically, the rods used to form tapered holes during the erection of concrete walls have a taper of only 3 degrees resulting from a change in diameter of 6 millimeters over a length of the rod of two feet (610 millimeters). The anchor bolt assembly 120 is thus designed to apply a full load whether inserted into the 19 millimeter end of the hole or the 25 millimeter end of the hole and still achieve a maximum load to securely retain the anchor in the receiving wall. In circumstances where the receiving aperture is still larger in diameter, for example, 1.25 inches (32 millimeters), an adaptor is provided which is generally indicated by reference numeral 160 in FIGS. 21 to 23. The adaptor 160 has a predetermined length which is commensurate with the length of the grip end 122 of the anchor bolt assembly 120 and is adapted to lie adjacent to the block 136 which in use abuts against the wall of the receiving hole. An inner surface of the adaptor 160 is shaped to at least partially enclose the static mating portion 124 and an outer peripheral surface 162 is roughened for radial penetrating into a surrounding hole. A resilient clip 164 is provided for securing the inner end 166 of the adaptor to the static mating portion 124.

It will be observed that at the inner end of the static mating portion 124, there is a second roughened surface 168 adjacent to the block 136 in order to provide additional radial penetration of the static mating portion 124 into the wall of a receiving hole at its outer end so that engagement between the anchor bolt assembly and the receiving hole is maximized even in a catastrophic failure.

Figure 22:
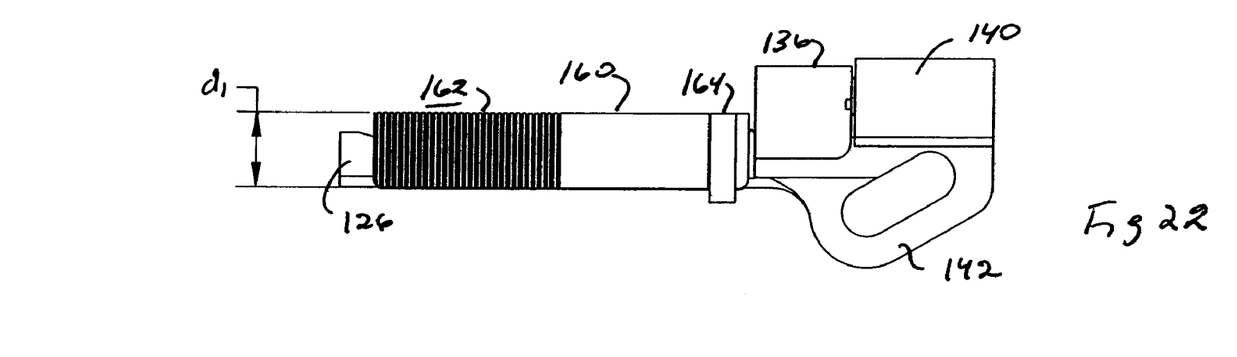
FIG. 22 is a side elevation view of the assembly of FIG. 21 with an adaptor in a preloaded condition.
Figure 23:
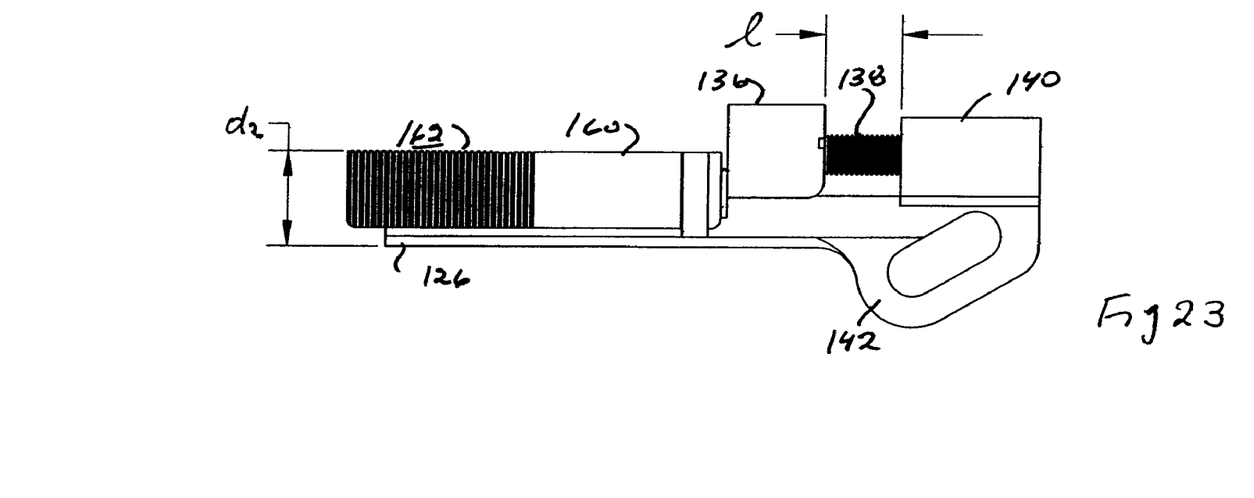
FIG. 23 is a similar view to FIG. 22 showing the assembly with the adaptor in a loaded condition.

Finally, FIGS. 22 and 23 illustrate the anchor bolt assembly 120 fitted with the adaptor 160 in an unloaded and loaded configuration respectively which shows that the diameter of the anchor bolt assembly at the distal end of the grip end 122 increases from $d_1$ to $d_2$ as the threaded fastener 138 is displaced its full length l.

It will be appreciated that several variations may be made to the above described embodiments of the invention within the scope of the appended claims as will be apparent to those skilled in the art. In particular, it will be appreciated that the manner of operation of the actuating end to separate the mating portions may vary considerably and that other forms and locations of an attachment loop may be provided, as required by the intended application of the anchor bolt assembly. For some applications, an attachment loop may be optional.

The invention claimed is:

1. Anchor bolt assembly for anchoring an object to a retaining structure having a pre-formed receiving hole for the anchor bolt, the anchor bolt having a generally cylindrical grip end formed by a static mating portion and a movable mating portion and an actuating end remote from the grip end for effecting relative longitudinal displacement of said mating portions, the mating portions each having at least one complementary ramp surface inclined to a longitudinal axis for the anchor bolt, the static mating portion having an outer peripheral surface which is roughened for radial penetration into a receiving hole, and the moveable mating portion having a smooth outer peripheral surface, whereby operation of the actuating end will cause the movable mating portion to slide relative to the static mating portion and apply radial pressure at the grip end of the anchor bolt assembly in a loaded configuration thereof, wherein the actuating end includes a threaded portion and a cooperating nut, wherein the threaded portion is formed at an end of the movable mating portion remote from the grip end, wherein the static mating portion has a coupling ring formed at an end remote from the grip end to slidingly receive the threaded portion of the movable mating portion therethrough.

2. An anchor bolt assembly according to claim 1 in which the outer peripheral surface of the static mating portion in the grip end is threaded.

3. An anchor bolt assembly according to claim 1 in which the mating portions each have a single complementary ramp surface formed at the grip end remote from the actuating end.

4. An anchor bolt assembly according to claim 1 in which the mating portions each have a pair of complementary ramp surfaces longitudinally spaced from each other and formed at the grip end remote from the actuating end.

5. An anchor bolt assembly according to claim 1 in which the mating portions each have an inner ramp surface and an outer ramp surface of predetermined length, the length of the outer ramp surface on the moveable mating portion being longer than the length of the inner ramp surface on the static mating portion so that a trailing edge of the outer ramp surface of the moveable mating portion will overlap a leading edge of the outer ramp surface of the static mating portion in a loaded configuration for the anchor bolt assembly.

6. An anchor bolt assembly according to claim 1 in which the mating portions each have an inner ramp surface and an outer ramp surface of predetermined depth, the depth of the outer ramp surface on the moveable mating portion being narrower than the depth of the inner ramp surface on the moveable mating portion so that a trailing edge of the inner ramp surface of the moveable mating portion and a leading edge of the inner ramp surface of the static mating portion overlap to define a fulcrum in a loaded configuration for the anchor bolt assembly that allows a rocking motion between the moveable mating portion and the static mating portion.

7. An anchor bolt assembly according to claim 3 in which an outer peripheral surface of the grip end defined by the movable mating portion has an arc length which is subtended by an angle of less than 90°.

8. An anchor bolt assembly according to claim 4 in which an outer peripheral surface of the grip end defined by the movable mating portion has an arc length which is subtended by an angle of more than 90°.

9. An anchor bolt assembly according to claim 1 in which the actuating end of the assembly has an attachment loop for attachment to an object.

10. An anchor bolt assembly according to claim 9 in which the attachment loop forms part of the movable mating portion.

11. An anchor bolt assembly according to claim 1 in which the cooperating nut forms part of the movable mating portion.

12. Anchor bolt assembly for anchoring an object to a retaining structure having a pre-formed receiving hole for the anchor bolt, the anchor bolt having a generally cylindrical grip end formed by a static mating portion and a movable mating portion and an actuating end remote from the grip end for effecting relative longitudinal displacement of said mating portions, the mating portions each having at least one complementary ramp surface inclined to a longitudinal axis for the anchor bolt, the static mating portion having an outer peripheral surface which is roughened for radial penetration into a receiving hole, and the moveable mating portion having a smooth outer peripheral surface, whereby operation of the actuating end will cause the movable mating portion to slide relative to the static mating portion and apply radial pressure at the grip end of the anchor bolt assembly in a loaded configuration thereof, wherein the actuating end includes a threaded portion and a cooperating nut, wherein the cooperating nut forms part of the movable mating portion, wherein the static mating portion has a transversely disposed lug for abutting an outer surface of a retaining structure and which defines a bearing surface for a threaded fastener received through the cooperating nut whereby the static mating portion and movable mating portion are coupled at the actuating end of the anchor bolt assembly.

13. An anchor bolt assembly according to claim 12 in which the transversely disposed lug has a recess and a resiliently biased plunger received in the recess for bearing against the threaded fastener, wherein release of the plunger from the recess is indicative of a load failure.

14. An anchor bolt assembly according to claim 12 in which the threaded fastener has a predetermined threaded length selected to withdraw the moveable mating portion from a receiving hole by a predetermined distance corresponding to a maximum separation between the static mating portion and the moveable mating portion.

15. Anchor bolt assembly for anchoring an object to a retaining structure having a pre-formed receiving hole for the anchor bolt, the anchor bolt having a generally cylindrical grip end formed by a static mating portion and a movable mating portion and an actuating end remote from the grip end for effecting relative longitudinal displacement of said mating portions, the mating portions each having at least one complementary ramp surface inclined to a longitudinal axis for the anchor bolt, the static mating portion having an outer peripheral surface which is roughened for radial penetration into a receiving hole, and the moveable mating portion having a smooth outer peripheral surface, whereby operation of the actuating end will cause the movable mating portion to slide relative to the static mating portion and apply radial pressure at the grip end of the anchor bolt assembly in a loaded configuration thereof, wherein the actuating end includes a threaded portion and a cooperating nut, wherein the cooperating nut has a smooth outer surface and a number of locating dimples formed to receive a tool with a corresponding number of cooperating lugs for rotating the nut on the threaded portion.

16. Anchor bolt assembly for anchoring an object to a retaining structure having a pre-formed receiving hole for the anchor bolt, the anchor bolt having a generally cylindrical grip end formed by a static mating portion and a movable mating portion and an actuating end remote from the grip end for effecting relative longitudinal displacement of said mating portions, the mating portions each having at least one complementary ramp surface inclined to a longitudinal axis for the anchor bolt, the static mating portion having an outer peripheral surface which is roughened for radial penetration into a receiving hole, and the moveable mating portion having a smooth outer peripheral surface, whereby operation of the actuating end will cause the movable mating portion to slide relative to the static mating portion and apply radial pressure at the grip end of the anchor bolt assembly in a loaded configuration thereof; and an adaptor for fitting into a larger diameter receiving hole, the adaptor having a predetermined length commensurate with said grip end, an inner surface being shaped to at least partially enclose said static mating portion and an outer peripheral surface which is roughened for radial penetration into a receiving hole.

17. An anchor bolt assembly for anchoring an object to a retaining structure having a pre-formed receiving hole for the anchor bolt, the anchor bolt having a generally cylindrical grip end formed by a static mating portion and a movable mating portion and an actuating end remote from the grip end for effecting relative longitudinal displacement of said mating portions, the mating portions each having at least one complementary ramp surface inclined to a longitudinal axis for the anchor bolt, the static mating portion having an outer peripheral surface which is roughened for radial penetration into a surrounding hole, the actuating end including a threaded fastener and a cooperating nut fixed to the movable mating portion, the static mating portion having a transversely disposed lug for abutting an outer surface of a retaining structure and which defines a bearing surface for the threaded fastener received through the cooperating nut, whereby operation of the actuating end will cause the movable mating portion to slide relative to the static mating portion and apply radial pressure at the grip end of the anchor bolt assembly.

18. An anchor bolt assembly according to claim 17 in which the actuating end of the assembly has an attachment loop for attachment to an object, the attachment loop forming part of the movable mating portion and the cooperating nut forming part of the attachment loop.

19. An anchor bolt assembly for anchoring an object to a retaining structure having a pre-formed receiving hole for the anchor bolt, the anchor bolt having a generally cylindrical grip end formed by a static mating portion and a movable mating portion remote from the grip end and an actuating end for effecting relative longitudinal displacement of said mating portions, the mating portions each having at least one complementary ramp surface inclined to a longitudinal axis for the anchor bolt, the static mating portion having an outer peripheral surface which is roughened for radial penetration into a surrounding hole, the actuating end including a threaded portion and a cooperating nut, the threaded portion being formed at an end of the movable mating portion remote from the grip end, the static mating portion having a coupling ring formed at an end remote from the grip end to slidingly receive the threaded portion of the movable mating portion therethrough and to limit radial separation of said mating portions at the actuating end, whereby operation of the actuating end will cause the movable mating portion to slide relative to the static mating portion and apply radial pressure at the grip end of the anchor bolt assembly.

20. An anchor bolt assembly according to claim 19 in which an attachment loop for attachment to an object forms part of the movable mating portion and is positioned between the threaded portion and the grip end of the anchor bolt assembly.

* * * * *